UNITED STATES PATENT OFFICE.

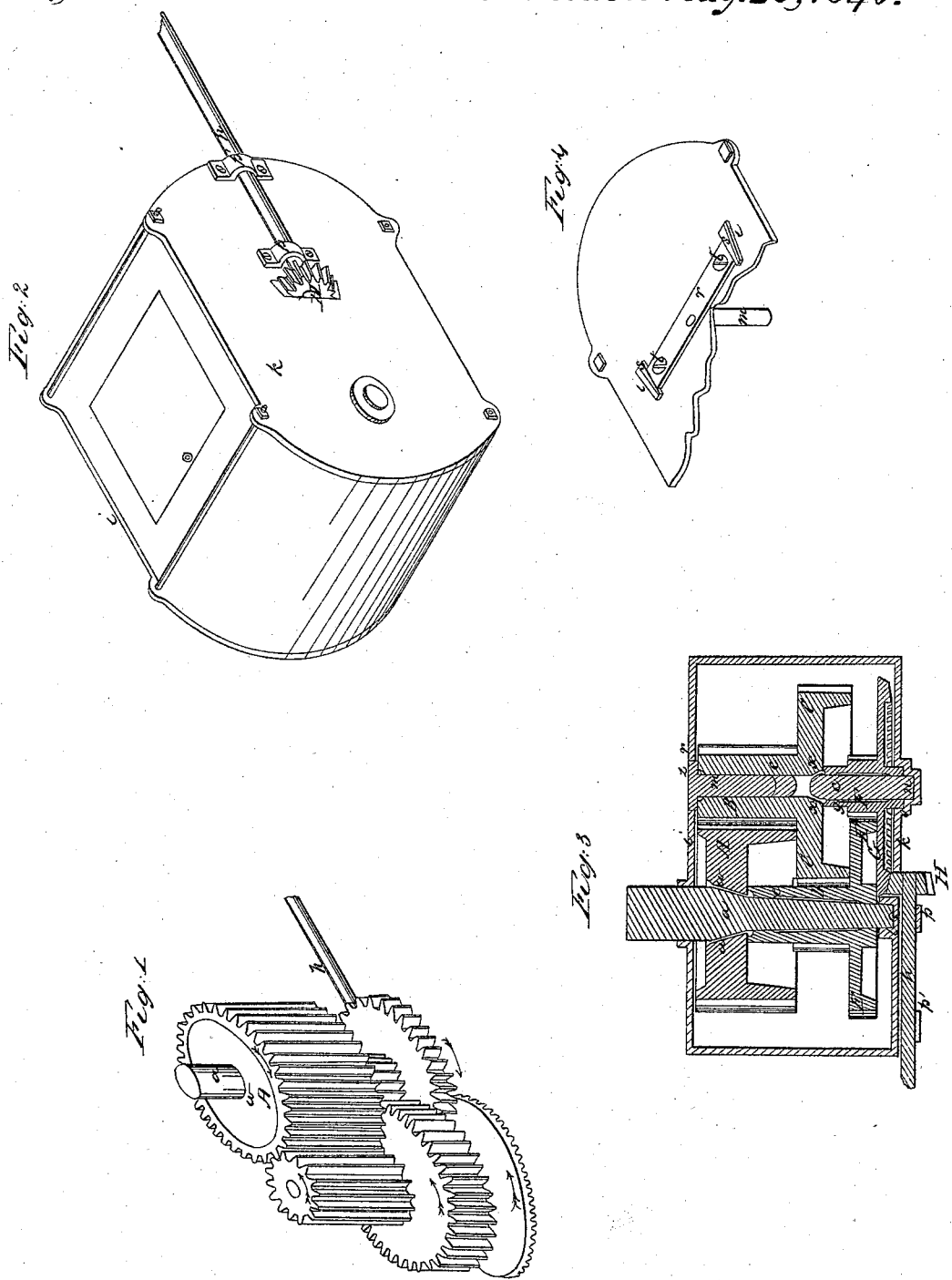

JAMES LEFFEL, OF SPRINGFIELD, OHIO.

ARRANGEMENT OF WHEELS AND SHAFTS FOR COMMUNICATING POWER.

Specification of Letters Patent No. 4,158, dated August 20, 1845.

*To all whom it may concern:*

Be it known that I, JAMES LEFFEL, of the town of Springfield, county of Clark, and State of Ohio, have invented new and useful improvements in the method of arranging cog or belt wheels applicable to horsepowers for driving machinery and for other purposes requiring velocities to be increased or decreased and the shafts thereof with a view to oil the bearings with greater facility than heretofore, and that the following is a full, clear, and exact description of the arrangement of the parts, the effect to be attained, and the manner of operating the same, reference being had to the accompanying drawings, making part of the same, in which—

Figure 1, is a perspective view of the arrangement as applied to a horse power, with the sides and ends of the frame removed, to give a full view of the arrangement of the gearing. Fig. 2, a perspective view of the machine cased in. Fig. 3, a vertical section passing through the shaft.

The same letters are used to indicate the same parts in all the figures in which they are visible.

The nature of my invention consists in arranging two series of cog or belt wheels upon two sets of shafts, each wheel with its pinion being on a section of one of the shafts, and the sections of each shaft working one within the other, and running in the same direction, instead of the reverse direction or upon permanent sleeves receiving one section within and the other without, the advantages of which arrangements will be fully pointed out hereafter.

The arrangement of the wheels as represented on the drawings, and the action of one on the other in the two series is, indicated by the letters A, B, C, D, E, F, G, and H, commencing with the master wheel A, and running through to the driver H, where the motion is given out. Wheel A, works into pinion B, on the same section of shaft with C, which takes into pinion D, on the same section of shaft with wheel E, having the same axis of motion as the master wheel A. The wheel E works into pinion F on the same section of shaft with wheel G, and having the same axis of motion as wheel C, and the wheel G works into the pinion H, of the line or other shaft $h$, from which the motion is taken to any machine to be operated. The master wheel is on the upper section $a$, of the first shaft which has its bearings in the upper and lower plates $i$, $k$, of the frame, the lower end being received in a step $l$, on the plate $k$, and the upper end in a box in the upper plate $i$. The sectional shaft $e$, of the wheel E, is hollow, and turns on, and in the same direction with the sectional shaft $a$, and has a shoulder $e'$ below the wheel E, that runs on the face of the step $l$, and projects over it to bear on the upper surface of the bevel wheel G to prevent its teeth from rising out of the bevel pinion H and as this shoulder runs in the same direction as the wheel G, though not so fast, there is less friction than if a permanent plate were used for that purpose.

The inner or upper section $c$, of the second shaft, which carries the wheel C, has, like the first shaft, its bearings in the upper and lower plates $i$, $k$, of the frame, the upper end turning on the pin $m$, attached to the upper plate $i$, and the lower end working in a step $n$, $m$, in the lower plate $k$, and the sectional shaft $g$ of the wheel G is hollow and runs on the inner section $c$, and in the same direction with it, and the lower end of this sectional shaft $g$, is received and runs in the box $o$, above, and of greater diameter than the step of the inner section $c$. The line shaft of the pinion H, runs in appropriate boxes $p$, $p'$, properly secured to the underside of the plate k. The pin $m$, see Fig. 4, on which the upper end of the sectional shaft $c$, runs is connected with the plate $i$ by means of a sliding plate $r$, which is regulated with keys $s$, $s$, for the purpose of adjusting the shaft to insure the fit of the cogs, and is then secured by screw bolts $t$, $t$. A hole $w$, is made through the wheel A just at the periphery of the inner section $a$, of the first shaft, and a similar one $x$, through the inner section $c$, of the second shaft, this latter one running down from the bottom of the hole which works on the pin $m$, to the surface of the shaft below the wheel C, and the outer sections $e$, and $g$, of the first and second shafts, have their upper end reamed out, or counter sunk, so that when on the inner section, a cup is formed all around to catch the oil that passes down through the holes $w$, $x$, to lubricate the shafts. The step $l$, of the first shaft, which is just over the box $p$ of the line shaft $h$, is pierced through to conduct the oil to this journal.

From this description it will clearly appear that by oiling the upper ends of the two shafts, the first around the box in which it works, and the second through a hole $z$, in the sliding plate $r$, to which the pin $m$, is attached; that the oil will pass down through the holes $w$, $x$, to lubricate the surface on which the two outer sections $e$, and $g$, turn, and thence passes down to the two boxes or steps in which the lower ends of the shaft work, and then through the hole in the bottom of the step to the box $p$, of the line shaft, thus oiling all the rubbing surfaces of the shafts by applying the oil to the two upper bearings.

By the arrangement of the two series of wheels upon the two axis transferring the motion from the first to the second, then back to the first and then again to the second, then back to the first, and then again to the second, and so on to any number of wheels, the shaft of one wheel turning on the shaft within it, and (as the result of the arrangement of the wheels) in the same direction and with greater velocity, the friction occasioned by the turning of the outer section on the inner tends to carry it around, and thus greatly reduces the actual friction; but another important advantage resulting from this arrangement of the wheels, besides that of great compactness, is the relieving the shaft from much of the pressure unavoidable in the usual mode of gearing up, for by reference to the drawings, which exhibit the direction of motion of the wheels and pinions by arrows, it will be seen that the wheel A turns the pinion B in the opposite direction, and that this makes pressure on the journals in one direction, and that the wheel C, attached to the pinion B, turns the pinion D, in the same direction as wheel A, making pressure on the shaft in a direction the reverse of that given to it by the wheel A, and thus balancing, in proportion to their relative powers, the force with which the shaft is pressed against its bearings, and in that proportion relieving the upper journal, which works in a permanent box, of a portion of its pressure which is thus transferred to the junction of the two sections of the first shaft, where, in consequence of the peculiarity above stated, much of this friction tends to carry around the inner or upper section of the shaft. The same effect it will be seen takes place on the second shaft, and this feature can be carried out to any number of wheels so long as the arrangement of the wheels is confined to two axes. The same arrangement it is obvious can be applied to belt wheels and needs no description.

Having thus fully described the characteristics of my invention and the manner of making and using the same, I wish it to be distinctly understood that I do not make claim to the employment of a series of wheels having the same axis of motion when the sections of the shafts are separated from each other by a permanent sleeve, or without the sleeve when the arrangement of the wheels is such as to cause the sections of the shaft to turn in reverse directions, as these are well known and do not attain the end contemplated by me, and pointed out above; nor do I claim simply oiling a journal through a perforation in the shaft as this has long since been known; but

What I do claim as my invention and desire to secure by Letters Patent is—

1. The arrangement of two sets of cog or belt wheels and pinions connected therewith, each set consisting of not less than two wheels with their appropriate pinions, on two shafts made in sections turning on each other and in the same direction, for the purpose of avoiding friction and rendering the machinery compact, as herein fully described.

2. And I also claim in combination with the arrangement of shafts herein described, the oil passages whereby the oil applied at two places, is conducted to all the rubbing surfaces of the series of shafts and bearings, as herein described.

JAMES LEFFEL.

Witnesses:
 CHS. M. KELLER,
 J. J. GREENOUGH.